United States Patent
Bergh et al.

(10) Patent No.: US 8,620,740 B2
(45) Date of Patent: *Dec. 31, 2013

(54) OFFER DELIVERY SYSTEM

(75) Inventors: Christopher P. Bergh, Lexington, MA (US); Michael S. Bauer, Shrewsbury, MA (US); Sidra Michon, Littleton, MA (US); Zack Miloushev, Boxford, MA (US); Kevin Furbish, Belmont, MA (US); Charles Evett, Concord, MA (US); Gregory Erman, Sudbury, MA (US); John Mandel, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/549,797

(22) Filed: Oct. 16, 2006

(65) Prior Publication Data

US 2007/0150334 A1    Jun. 28, 2007

Related U.S. Application Data

(63) Continuation-in-part of application No. 09/575,283, filed on May 22, 2000, and a continuation of application No. 09/777,614, filed on Feb. 5, 2001, now Pat. No. 8,533,038.

(60) Provisional application No. 60/135,521, filed on May 21, 1999, provisional application No. 60/180,254, filed on Feb. 4, 2000.

(51) Int. Cl.
*G06Q 30/00*    (2012.01)

(52) U.S. Cl.
USPC .................. 705/14.35; 705/14.1; 705/14.25

(58) Field of Classification Search
USPC ................................. 705/14.1, 14.25, 14.35
See application file for complete search history.

(56) References Cited

U.S. PATENT DOCUMENTS

| | | | |
|---|---|---|---|
| 5,368,129 A * | 11/1994 | Von Kohorn | 186/52 |
| 5,710,886 A | 1/1998 | Christensen et al. | |
| 5,765,154 A | 6/1998 | Horikiri et al. | |
| 5,848,396 A | 12/1998 | Gerace | |
| 5,883,940 A | 3/1999 | Thornton | |
| 5,930,764 A | 7/1999 | Melchione et al. | |
| 5,966,965 A | 10/1999 | Melchione et al. | |
| 5,974,407 A | 10/1999 | Sacks | |
| 6,067,525 A | 5/2000 | Johnson et al. | |
| 6,076,068 A * | 6/2000 | DeLapa et al. | 705/14 |

(Continued)

OTHER PUBLICATIONS

Griggs, Robin. "Give us leads! Give us leads!" Sales and Marketing Management. New York: Jul. 1997. vol. 149, Iss. 7; p. 66 (from Proquest).

(Continued)

*Primary Examiner* — Raquel Alvarez
(74) *Attorney, Agent, or Firm* — Cuenot, Forsythe & Kim, LLC

(57) ABSTRACT

An offer delivery system provides a mechanism for coordinating presentation of offers to customers that may originate from multiple different sources and that may be delivered to the customers over different channels. The systems makes use of rules to prioritize, select, and time the delivery of offers to any particular customer, allocate limited resources in the channels to deliver offers to a set of customers, and provide mechanisms for users or their agents to limit the delivery of offers, for example, by their frequency or type.

20 Claims, 7 Drawing Sheets

(56) References Cited

U.S. PATENT DOCUMENTS

| | | | |
|---|---|---|---|
| 6,078,892 | A | 6/2000 | Anderson et al. |
| 6,097,792 | A | 8/2000 | Thornton |
| 6,134,530 | A | 10/2000 | Bunting et al. |
| 6,236,977 | B1 | 5/2001 | Verba et al. |
| 6,694,316 | B1 | 2/2004 | Lengseth et al. |
| 6,868,389 | B1 | 3/2005 | Wilkins et al. |
| 7,424,439 | B1 * | 9/2008 | Fayyad et al. ............... 705/10 |
| 2001/0032128 | A1 * | 10/2001 | Kepecs ....................... 705/14 |
| 2002/0026356 | A1 | 2/2002 | Bergh et al. |
| 2002/0035568 | A1 * | 3/2002 | Benthin et al. ............. 707/102 |
| 2005/0045728 | A1 | 3/2005 | Kargman |
| 2006/0143086 | A1 | 6/2006 | MacArtney-Filgate et al. |
| 2008/0027810 | A1 | 1/2008 | Lerner et al. |
| 2008/0103888 | A1 | 5/2008 | Weir |
| 2010/0106598 | A1 | 4/2010 | Grimes |
| 2011/0208578 | A1 | 8/2011 | Bergh et al. |

OTHER PUBLICATIONS

McGinnis, Frank and Lisa McCarty. "Strategic account management in the new procurement environment" Supply Chain Management. Bradford: 1998. vol. 3, Iss. 1; p. 12 (from Proquest).

"General Interactive Teams up with IBM to Deliver Industries Best E-Business and Relationship Marketing Solutions". Business/Technology Editors. Business Wire. New York. May 3, 1999. (from Proquest).

"Microsoft Announces Internet Lead Management Platform", from www.microsoft.com, Jan. 24, 2000.

WIPO Application PCT/US2000/014092 International Search Report, Aug. 14, 2000, 6 pgs.

"Netscape and Aurum Extend Enterprise-level Sales and Marketing Applications to the Internet," Netscape Communications Corporation, Feb. 20, 1996, [retrieved Nov. 10, 2008] retrieved from the Internet: <http://form.netscape.com/newsref/pr/newsrelease92.html>, 2 pgs.

\* cited by examiner

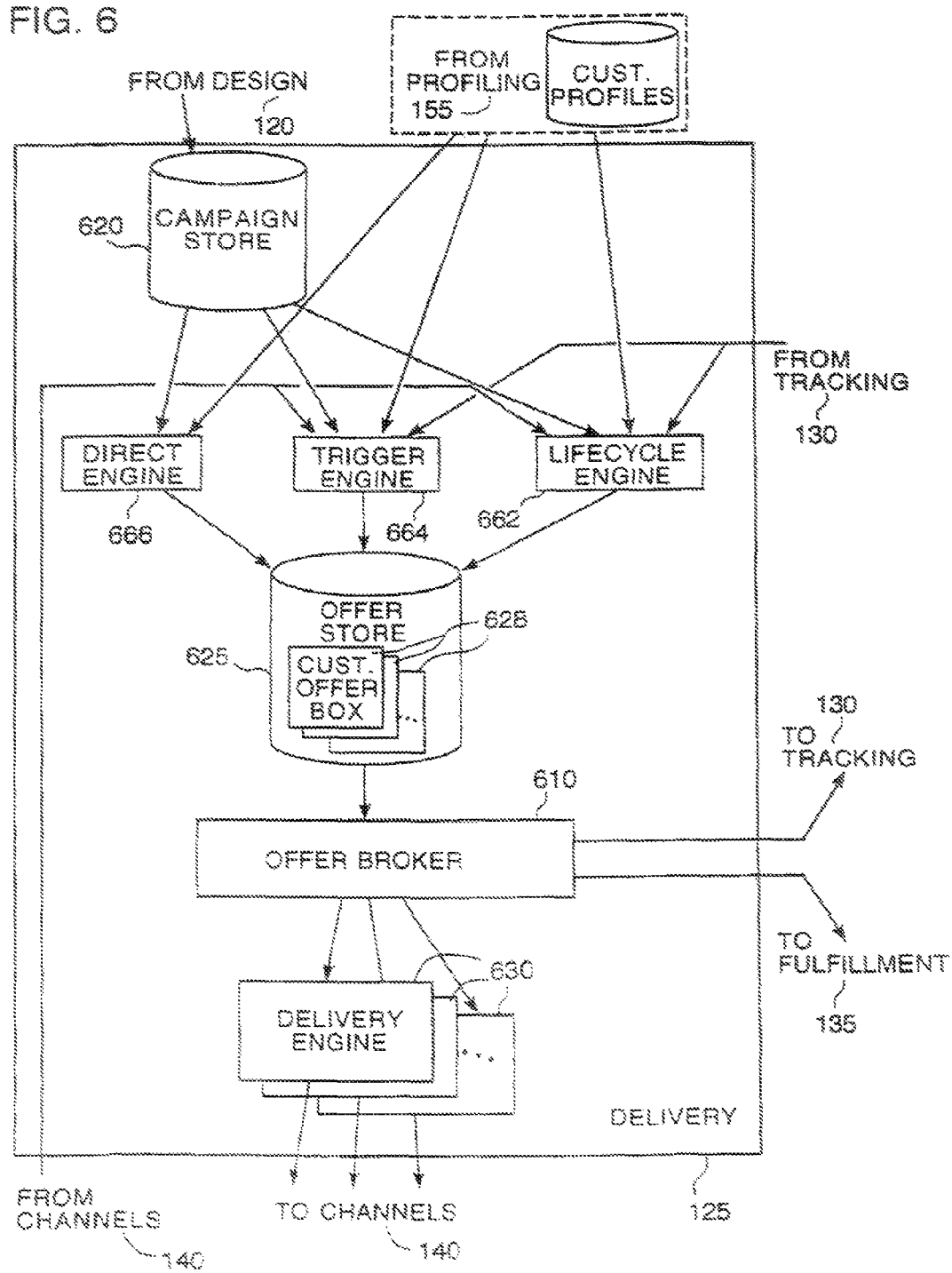

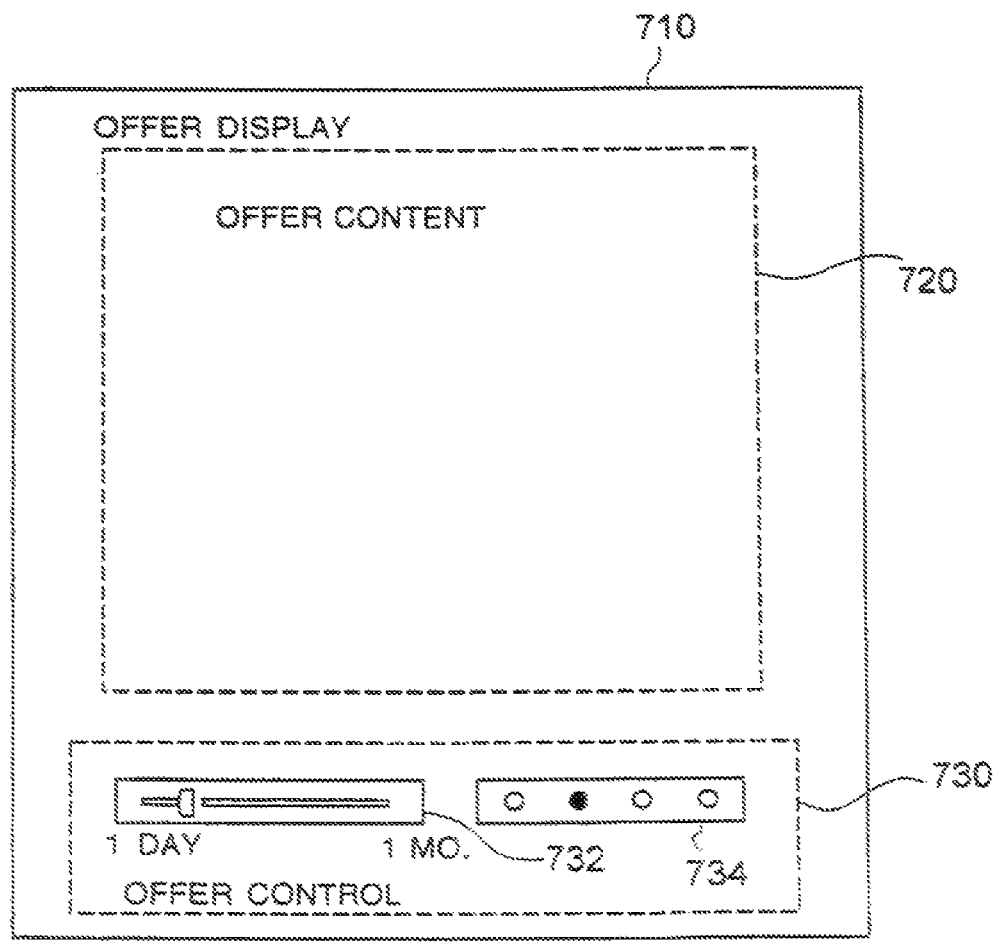

OFFER DELIVERY SYSTEM

CROSS-REFERENCE TO RELATED APPLICATIONS

This application is a continuation-in-part of U.S. application Ser. No. 09/575,283, "Customer Lead Management System," filed May 22, 2000, and a continuation of U.S. application Ser. No. 09/777,614, "Offer Delivery System," filed Feb. 5, 2001, now U.S. Pat. No. 8,533,038 both of which claim the benefit of U.S. Provisional Application No. 60/135,521, filed May 21, 1999, all of which are incorporated herein by reference. This application also claims the benefit of U.S. Provisional Application No. 60/180,254, filed Feb. 4, 2000, which is also incorporated herein by reference.

BACKGROUND

This invention relates to a system for managing and distributing offers.

Many organizations currently use traditional marketing channels, such as direct mailings, and increasingly electronic delivery, such as electronic mail (email) or the World Wide Web, for delivery of advertising and sales offers to its customers or potential customers. In large organizations, offers to a particular customer may originate from different parts of the organization. There is the potential that offers to that customer from these different parts of the organization or through different channels may conflict in some way, thereby reducing the effectiveness of the communication with that customer.

Many customers may prefer to receive fewer offers from a particular organization or over a particular channel, or to receive no offers at all. For electronic channels, such as email, an organization may provide a mechanism to "unsubscribe" from all future offers. The customer may also configure his or her client software to discard future offers, for example, by discarding email from a particular address. Web-based advertising on web sites is often targeted to particular classes of users, for example by keeping a record of individual user's previous activities on those web sites.

SUMMARY

As the number of electronic, as well as traditional, methods of interacting with customers increase, it becomes increasingly difficult to coordinate interactions using these various methods. In a general aspect, the invention provides a mechanism for coordinating presentation of offers to customers that may originate from multiple different sources and that may be delivered to the customers over different channels. This coordination makes use of rules to prioritize, select, and time the delivery of offers to any particular customer, allocate limited resources in the channels to deliver offers to a set of customers, and provide mechanisms for users or their agents to limit the delivery of offers, for example, by their frequency or type.

In one aspect, in general, the invention is a computer-controlled method for managing and distributing offers. The method includes preparing data characterizing a set of offers, each offer being associated with a targeted individual and one multiple channels for presenting offers. These individuals can be, for example, actual or potential customers of products or services associated with the offers. A number of offers are selected for presenting to the individuals associated with those offers, including for at least some individuals, selecting from multiple offers associated with each of those individuals. The selected offers are presented to the associated individuals over the associated channels.

The invention can include one or more of the following features:

Selecting from the offers includes prioritizing offers for particular individuals, and selecting offers according to their priorities.

Selecting from the offers includes allocating capacity of the channels to the selected offers, thereby not exceeding a capacity associated with each of the channels.

Presenting the selected offers includes accepting information from individuals and limiting presentation of the offers to said individuals according to said accepted information. The accepted information can characterize acceptable timing of presentation of offers to the individuals, and limiting presentation of offers then includes scheduling presentation of offers to the individuals according to the acceptable timing. For example, acceptable timing can relate to a frequency control by which an acceptable frequency of offers is specified by the individual. Other types of timing can relate, for example, to acceptable periods of the day during which presenting offers is acceptable to the individual.

The data characterizing the offers includes one or more of: data characterizing conditions under which said offers are to be presented, data characterizing the target groups associated with said offers, and data characterizing information to be presented with the offers.

The method further includes tracking activities of the individuals to whom the offers were presented. Statistics related an effectiveness of the offers can be reported. A sequence of related offers can be presented to those individuals based on their tracked activities.

Preparing the data characterizing the offers includes, for at least some of the offers, a first user preparing data characterizing a class of offers, passing the data characterizing the class of offers to a second user, and the second user preparing additional data characterizing the offer.

The method further includes storing the prepared offers in a shared storage. The step of selecting from the offers is performed in a distributed manner in which separate computers access the shared storage.

In another aspect, in general, the invention is an offer management system. The system includes an offer design component for preparing data characterizing a set of offers. Each offer is associated with a corresponding target group of individuals. The system also includes a delivery component for selecting and presenting the offers to the individuals in the corresponding target groups, including a broker for prioritizing offers to particular individuals, for allocating capacity on a plurality of channels for presenting the offers, and for limiting presentation of the offers to individuals in the corresponding targets groups.

Other features and advantages of the invention are apparent from the following description, and from the claims.

DESCRIPTION OF DRAWINGS

FIG. 6 is a block diagram of a delivery component of the system; and

FIG. 7 is a diagram that illustrates a presentation of an offer to a customer, including controls for a customer providing feedback to the system.

DESCRIPTION

Figure 1:
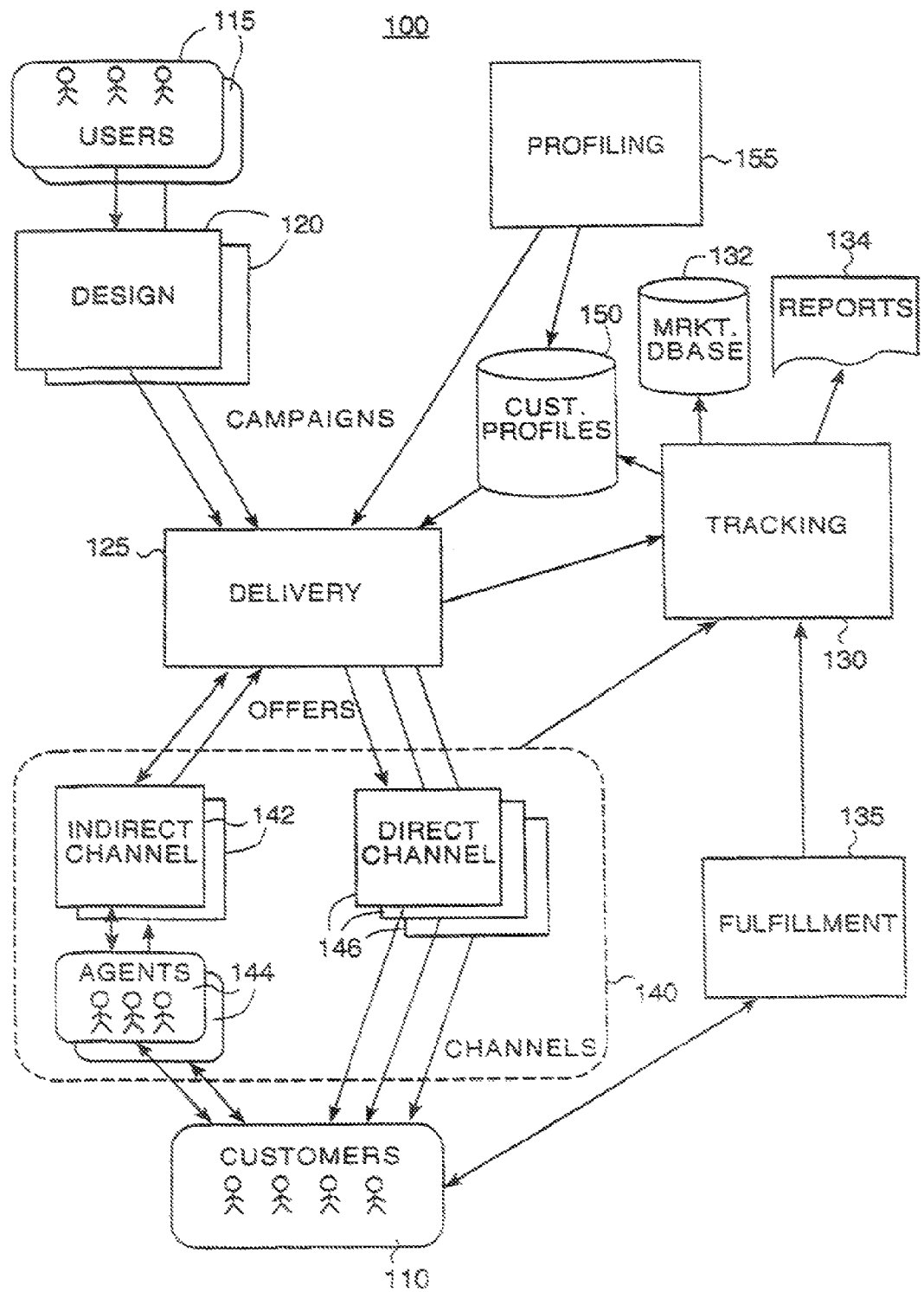
FIG. 1 is a logical block diagram illustrating components of an offer management system.
Figure 2:
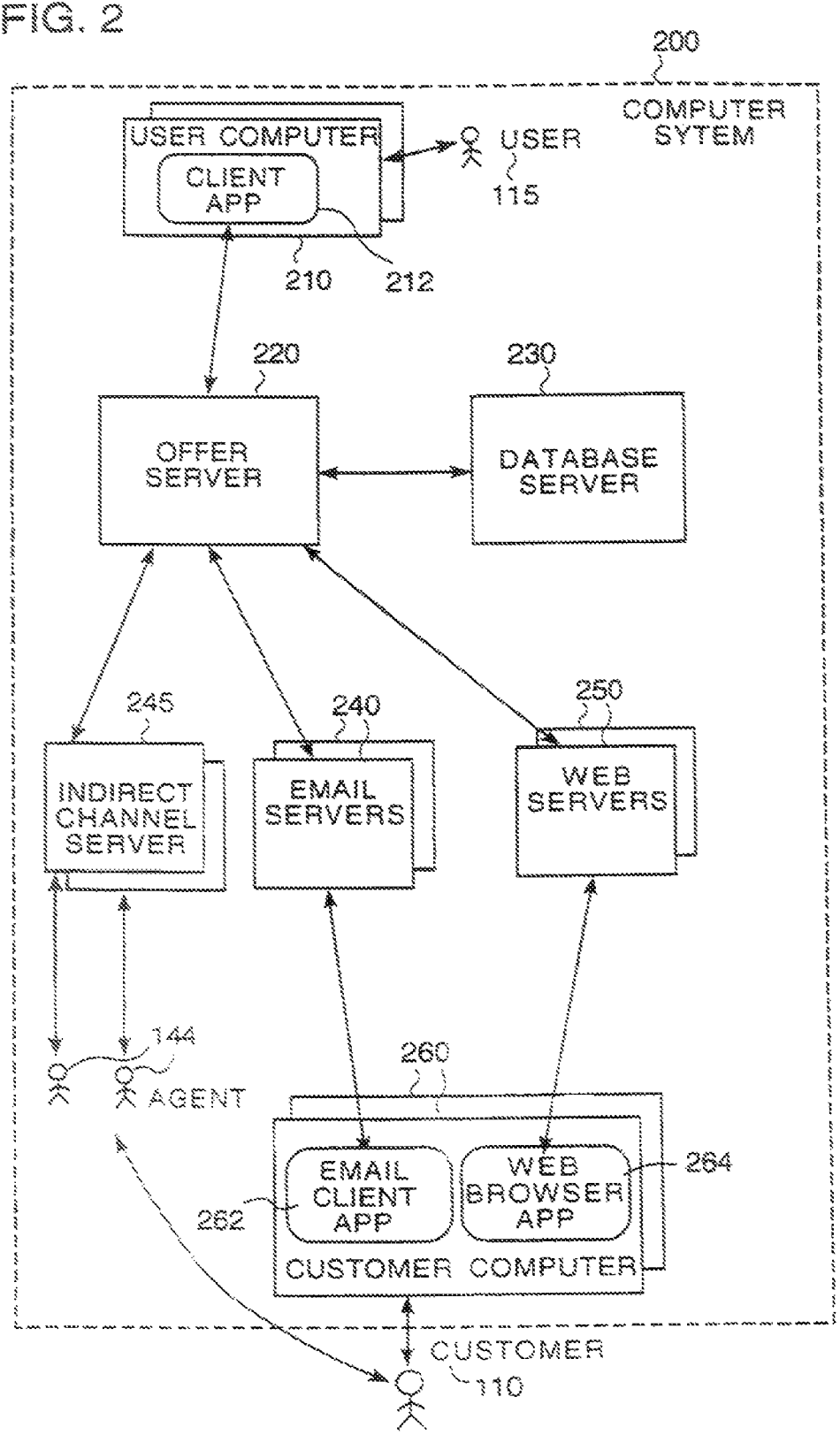
FIG. 2 is a block diagram of a computer system used to host the offer management system.

1 Architecture (FIGS. 1-2)

Referring to FIG. 1, an offer management system 100 is used to select, deliver, and track offers. The offers have various forms and include commercial offers, which are related to particular commercial enterprises. The offers are initiated by one or more users 115 of the offer management system. Users 115 include individuals who are involved in sales and marketing efforts of the commercial enterprises, such as product marketing managers, sales managers, and marketing campaign directors. The offers are delivered by offer management system 100 to customers 110. The term "customers" includes individuals or entities that are desired targets for the offers. For commercial offers, these customers include current or potential customers or consumers of products or services provided by commercial activities, as well as intermediate business customers (e.g., "business-to-business" customers, distributors, resellers, etc.) and individuals representing such business customers. The term "offer" includes various types of solicitations, advertisements, or any information-containing communication with the customer. In the case of commercial offers, they include solicitations that further commercial interests of the enterprise. For example, an offer can be a specific offer to sell a product or a service, a solicitation of interest in a product or service, advertising, or any of a wide variety of commonly used forms of communication directed at customers. In the discussion below, a "campaign" refers to a collection of offers, often specified as a template or rule from which one or more offers to specific customers determined. In this terminology, users 115 specify campaigns, and the system creates sets of specific customer offers from the campaigns.

Offer management system 100 supports delivery of offers to customers 110 through a wide variety of channels 140. In the discussion below, a number of these channels are specifically identified, but it should be understood that the invention is applicable to many more types of channels, some of which may not yet be commonly used. The channels include both traditional channels, such as direct postal mailings and solicitations by sales agents, as well as electronic channels, such as email and Web delivery, and could include channels such as personalized location-based delivery of advertising to hand-held devices. In general, offers can be delivered to any particular customer 110 through multiple of these channels. The offer management system provide a basis of controlling the potential flood of offers any one customer might receive.

Offer management system 100 includes a number of logical components that are hosted on a computer system, which generally includes a number of distributed server and client computers. These components control flow of offers from users 115, or a collaborating set of users #0115, to customers 110. The flow of an offer generally begins with a user 115 using a design component 120 to specify a campaign. The campaign may specify a single offer to a particular customer 110. More typically, the campaign specifies a number of offers that are targeted to a group of customers 110 that share some common characteristic. Multiple users 115 are typically involved in the task of specifying different campaigns. In this embodiment, these users can work independently of one another, potentially generating offers that can be targeted to the same individuals. As illustrated in FIG. 1, the system can include multiple design components 120, each of which passes campaigns through a common delivery component 125 associated with the population of customers 110. The campaigns are passed as data, which characterizes the resulting offers, from design component 120 to a delivery component 125.

Channels 140 include a number of direct channels 146, which are channels that do not involve an intermediary in presenting an offer passing through the channel to the customer. Examples of direct channels 146 include email, Web, and direct mailings. Channels 140 also include indirect channels 142 through which offers are first delivered to agents 144, who then present the offers to customers 110. Examples of agents 144 are sales representatives of an organization who interact with customers 110. Some indirect channels 142 include automation tools, such as sales-force automation (SFA) systems and lead management systems that provide support to sales agents. In other indirect channels 142 offers are delivered to agents using simpler mechanisms such as electronic mail and facsimile. Channels 140 also include outbound call centers through which customers 110 are solicited by telephone. Operators at these call centers can make use of a lead management system in interacting with the customers.

Delivery component 125 is responsible for selecting (e.g., filtering) and timing delivery of (e.g., prioritizing and limiting the frequency) of offers to appropriate customers 110 based on the campaigns it receives from design components 120. Delivery component 125 presents offers through channels 140 using a variety of different types of interactions with customers 110. For example, delivery component 125 can send an electronic mail message to one or more customers 110 that includes an offer. In this case, it is not essential that the customers communicate directly with the delivery component in response to the offer. For example, if the offer includes a specific sales offer, the customer may directly act on the offer by performing an online transaction. For some of such transactions, a fulfillment component 135 handles the transaction. Delivery component 125 can also present an offer using a Web interaction. In this case, delivery component 125 reacts to a particular customer 110 (or a member of a defined class of customers) accessing a Web server application and presents an offer, for example using a "banner ad," that user with an offer targeted to that user.

In some instances, a customer 110 provides explicit or implicit feedback to delivery component 125 in response to an offer. For instance, in the case of a Web presentation of an offer, a customer may provide explicit feedback by "clicking" on a displayed button on the presentation of the offer. Implicit feedback can include delivery component 125 recording a customer's access to a Web server after an offer has been presented. In some forms of email, deliver component 125 may receive a notification that the customer has read the email. Also, some email may solicit an email response, for example, to receive further information about an offer.

Delivery component 125 can also pass information directly to fulfillment component 135. For example, a customer 110 may provide feedback to delivery component 125 that he wants to accept an offer. Instead of completing the transaction directly, delivery component 125 may inform fulfillment component 135, and the fulfillment component then interacts with the customer to complete the transaction.

Delivery component 125 also passes offers to customers 110 through indirect channels 142. One example of an indirect channel 142 includes a lead management system. Such a lead management system is described in U.S. patent application Ser. No. 09/575,283, "Customer Lead Management System." In this case, rather than presenting an offer directly to a customer 110, delivery component 125 passes data to the lead management system that identifies the offer and the targeted customer. Then an agent 144 makes use of the lead management system, for instance, in contacting the targeted customer in person to act upon the lead.

Indirect channels 142 also at times provide information to delivery component 125. For example, if an agent 144 has interacted with a particular customer 110, the agent or an automated component of the indirect channel can inform the delivery component so that the delivery component limits presentation of further offers to that customer for a period of time. Similarly, fulfillment component 135 at times provides information to delivery component 125. For example, if a customer 110 performs a transaction using fulfillment component 135, fulfillment component 135 may notify delivery component 125, which may provide additional offers to that customer that are tailored for "cross-selling" of products or services related to that transaction.

A tracking component 130 receives information from delivery component 125, fulfillment component 135, and channels 140. This information is used to characterize various aspects of the offers made by delivery component 125. For instance, the success of particular marketing campaigns, which are associated with groups of offers, is tracked by tracking component 130. One product of this tracking are reports 134, which can include characterizations of the effectiveness of various types of offers. Another related product is data that is input to a marketing database 132, from which various reports can be generated.

Tracking component 130 also provides data to a customer profile database 150. This data includes information specific to particular customers 110, or to classes of customers. For example, the effectiveness of certain types of offers may be recorded in customer profile database 150 for different customers. Delivery component 125 can then make use of this information in determining which offers to present to a particular customer.

A profiling component 155 is used assemble information about particular customers 110. This information can come form various sources, such as external marketing databases, systems for passive monitoring of customer access to Web servers (click monitoring), and from customer-provided information, such as survey forms filled out by customers when registering a product. Profiling component 155 provides data to customer profile database 150 in a batch mode, for later use by delivery component 125. Profiling component 155 can also provide information directly to delivery component 125, for example, triggered by obtaining particular information about a customer.

Referring to FIG. 2, the logical modules of offer management system 100 are hosted on a computer system 200, which generally includes a number of distributed server and client computers. The logical components include modules that are implemented by software-controlled processes executing on these computers, and include storage modules, provided, for example, by storage devices coupled to the computers or by a dedicated database server computers. The software for controlling these computers is stored on media (not shown), such as magnetic disks coupled to server and client computers, and in some embodiments is downloaded from server computers to client computers at run-time, for instance in the form of "applets" that are downloaded to client computers as needed.

In this embodiment, an offer server 220 hosts portions of design component 120 and delivery component 125. A user 115 interacts with the system using a user computer 210, on which a client application 212, such as a Web browser application, executes. Client application 212 communicates with offer server 220, for instance over a local or wide area data network. Offer server 220 communicates with a number of different server computers that are associated with channels 140. These includes one or more email server 240 and one or more Web servers 250, which are used to pass offers to customers 110. Indirect channel servers 245, such as sales force automation servers and lead management servers, provide a path for passing offers to agents 144, who then in turn communicate with customers 110. Other server computers are associated with channels 140 are not shown, including a fax server for transmission of offers to customers. A customer 110 uses a customer computer 260 to access the offers passed from an email server or a Web server using an email client application 262 or a Web browser application 264 hosted on the customer computer.

Email client application 262 and Web browser application 264 are often used together, or their functions are alternatively integrated into a single application. For instance, offers may be sent to the customer as email that includes references to data that is accessed from a Web server. This can be the case when email is formatted according to the HTML (hyper text markup language), which allows embedding of "links" to data available elsewhere on the data networks to which the customer computer may be coupled, such as from Web server.

Various types of email client applications 262 are used by different customers, and each type may have be configured to accept different formats of messages. For example, some email client applications may be able to display HTML formatted messages to a customer, while others cannot. Some email systems, such as the America Online (AOL) system, can include special information that is particularly tailored to the AOL system. Similarly, different Web browser applications 264 may have different capabilities regarding the type of information that is presentable. One function of delivery component 125 (FIG. 1) is to attempt to present the offers in the formats best suited for each customer's client applications.

Computer system 200 also includes a database server 230, such as a SQL server, that provides storage for information that includes currently pending offers, and customer profiles.

In an alternative embodiment, the logical components shown in FIG. 1 are distributed and replicated on multiple servers. That is, copies of individual components are hosted on multiple servers, for instance, to distribute load and to provide fault tolerance. Offers are accessible to multiple instances of delivery component 125, either using a shared database such as one using the Linda system to provide a shared message storage, or by replicating the offers at the separate instances. The instances of the offer brokers are coordinated so that the same offers are not acted upon by multiple offer brokers, thereby preventing a customer from receiving duplicate or conflicting offers. Some offers are designed to be handled as a group and these are identified so that they can all be handled by one of the offer brokers.

Figure 3:
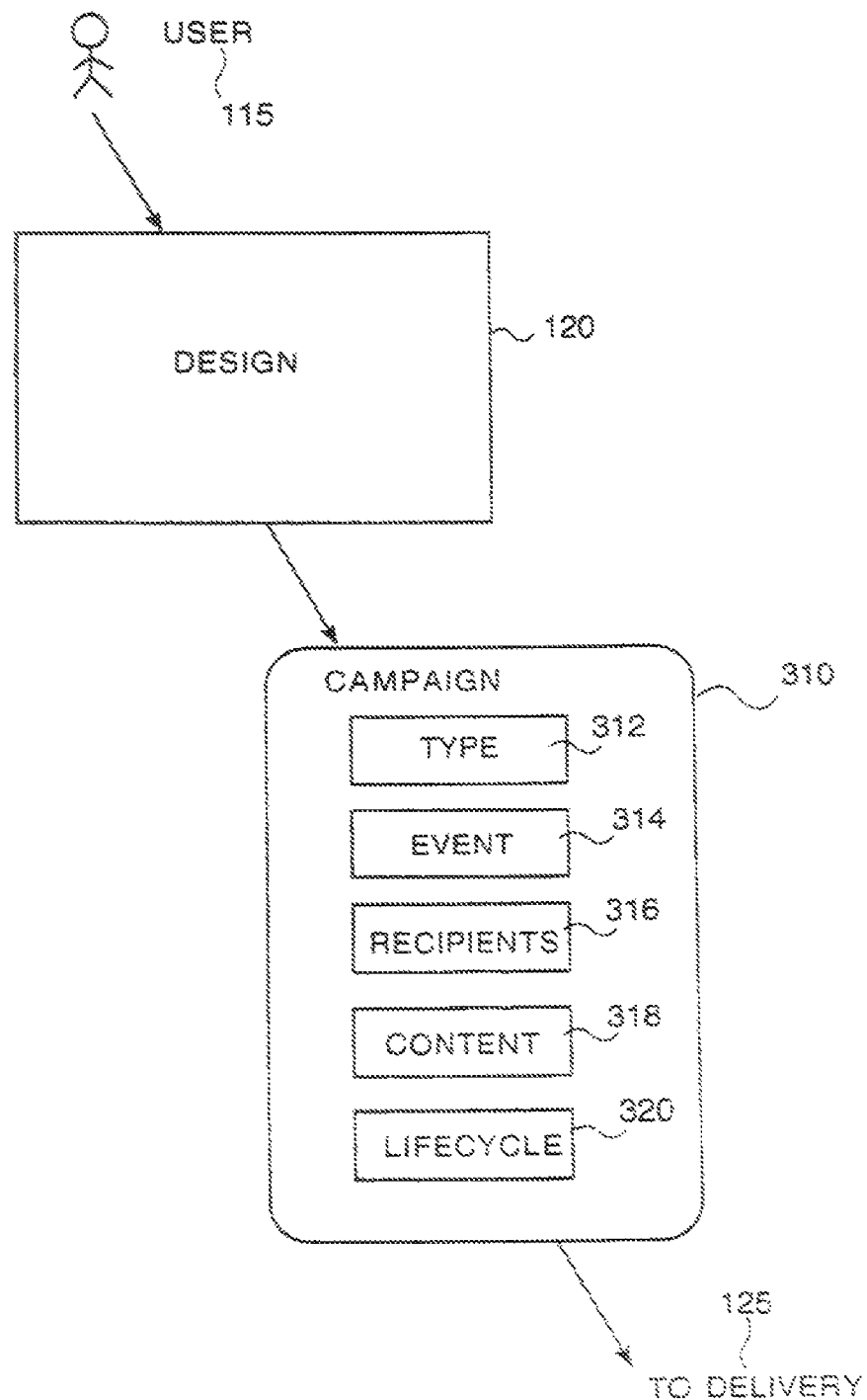
FIG. 3 is a diagram that illustrates components of an offer prepared using the offer management system.
Figure 4:
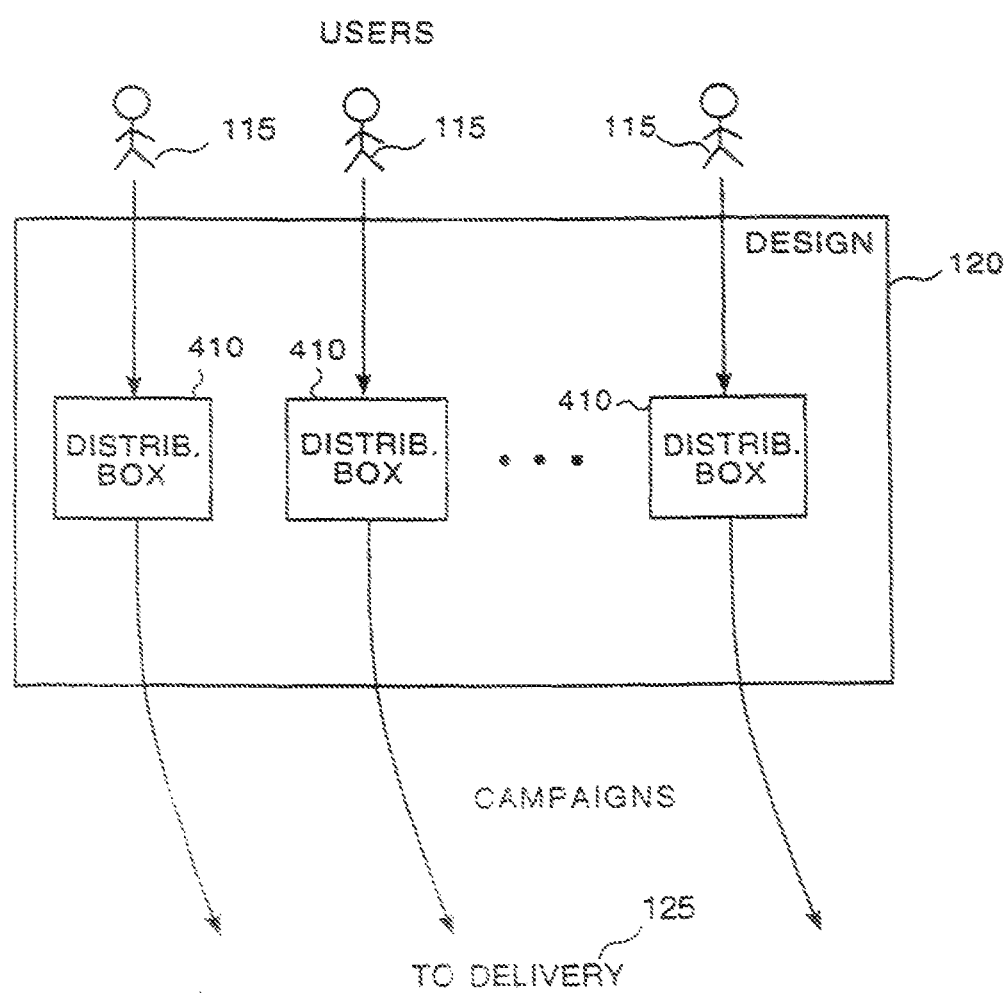
FIG. 4 is a block diagram of a design component of the system.
Figure 5:
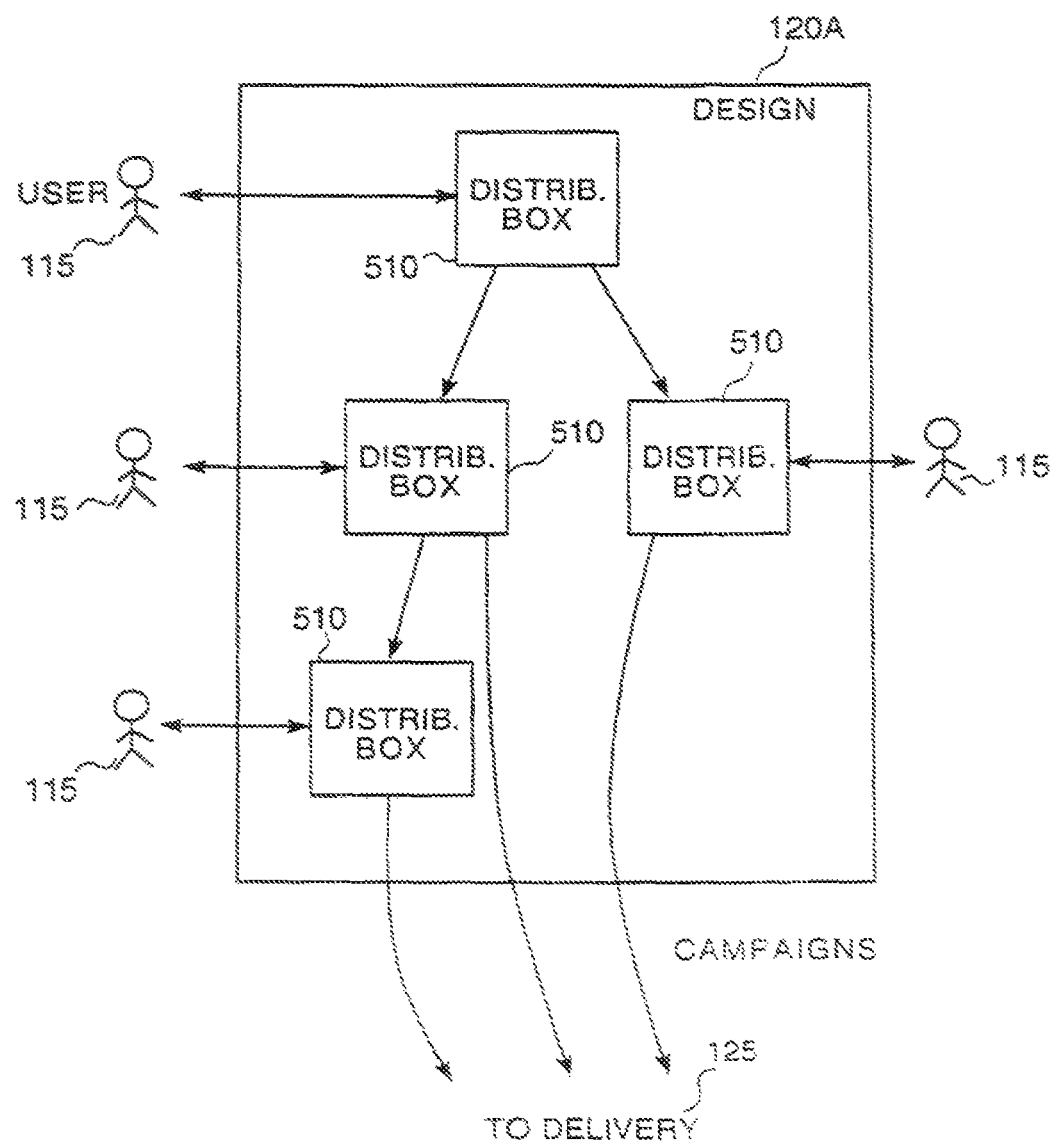
FIG. 5 is a block diagram of an alternative design component in which a hierarchy of users prepare offers.

2 Design Component (FIGS. 3-5)

Referring to FIG. 3, as introduced above, a user 115 make use of design component 120 (see FIG. 1) to specify campaigns 310 which are passed to delivery component 125 as data structures holding data that specify characteristics of the offers to be sent according to those campaigns. Various types of campaigns include some, but not necessarily all, of the following fields:

a type 312, which characterizes the general nature of the campaign, an event 314, which characterizes the condition under which offer under this campaign are sent to a customer 110, a recipient 316, which characterizes a particular customer or a class (e.g., a market segment) of customers 110 to whom the campaign is targeted, content 318, which characterizes the material that is to be included with each offer, and lifecycle 320, which encodes time-based rules and characterizes a set of related offers are to be sent to customers in this campaign.

Type 312 can identify one of a number of offer types to be sent, including the following:

Notifications of new products, news, events, newsletter and bulletins—An example of this type of offer is a weekly newsletter that is sent a customer list.

Offers of products that match a customer profile—An example of this type of offer is one that is presented to customers, for example, on a Web site based on characteristics that a customer provided in a registration survey. When a customer with these characteristics visits a particular Web site, delivery component 125 reacts by presenting the offer to that user.

Inferred product recommendation—In situations in which a customer has not explicitly provided information, characteristics of that user can often be inferred by their other activities such as related transactions and navigation history at various Web sites and used to select products.

Order solicitations—This type of offer may be a Web form that directs a Web server that implements part of fulfillment component 135.

A notification of customer status—This "offer" notifies the customer about a recent event related to an action that they took, such as acceptance of profiling information by the system, completion of a request for the customer, and execution of an order by the customer Event 314 characterizes the condition under which user 115 wants offers to be sent to a customer 110. The event is specified as a triggering condition or rule. For instance, profiling component 155 collects information about the Web visitor. This information is passed to delivery component 125 where it can be used to determine whether a triggering condition for a particular offer has been satisfied. Another triggering conditions includes a customer explicitly expressing interest in an offer, for example by asking for product information using email or a Web form. User 115 can also specify IF-THEN statements. An example of use of such statements include web visitors who meet a set of qualification criteria (based on title, budget or income, company size, etc.) that automatically qualify for a special discount.

A customer purchasing or registering another product can also trigger offers. For example, the offer may be a promotion of a complementary product. Another example is an offer that is triggered by a customer providing registration information at a Web site, such as an offer with a discount coupon for a purchase from a web site at which the customer registered. Offers can also be triggered based on the status of previously sent offers, for instance as reminders. Offers can also be triggered by another external input to the delivery component. For example, an offer may be triggered at the initiation of a sales agent through an indirect channel 142.

Other triggering conditions can be based on customer profile information stored in the system. For instance, certain types of offers may not be sent to customers unless they have explicitly "opted-in" to receiving such offers. This feature is particularly needed in situations in which an enterprise is not permitted to send certain type of solicitations to a customer without their consent, for instance because of legal restrictions or following privacy policies of the enterprise. Also, as described further below, particular customers 110 may have specified a maximum frequency that offers may be sent to them, and abiding by such a request is an implicit or explicit condition of the offer.

Recipient 316 of an offer includes data that can define a class of customers 110 to whom offers may be sent, subject to other limitations, such as the conditions described above. Note that an campaign can be thought of as a template for offers that are instantiated for particular customers identified through the recipient field. The specific customers to whom the offer is sent by delivery component 125 can be based on a database query of customer profile database 150, or base on information from profiling component 155. The offer management system separately delivers and tracks the instances of offers sent to particular customers. Recipient 316 can also identify one or more specific customers 110, rather than specifying an entire segment or class of customers. For example, an offer may be directed to a predetermined set of purchasing agents associated with a particular business customer.

Content 318 specifies the content and layout of the information of an offer that is to be transmitted to a customer. This content can be text, formatted HTML data, or other forms of multimedia. Often the content is to be personalized to each customer, and content 318 identifies portions that need to be filled in (such as the customer's name) before delivery. Content 318 can include multiple portions. For example, an email message may be sent directly to customers, while HTML links in the email message reference portions of the content that are placed on web servers. Content 318 can also reference secondary content that is provided by other parties, such as on Web servers of other commercial enterprises.

Lifecycle 310 specifies time-based rules that affect how related offers are sent to a customer. Campaigns have different types of lifecycles. Some campaigns are "direct" in that once deliver 125 receives a campaign, it immediately initiates offers based on the campaign and sends these offers to customers. Other campaigns are "triggered." These campaigns are turned into specific offers only particular conditions occur. Finally, some campaigns have a more complex time plan, or lifecycle. For example, a number of staged offers may be sent to a customer as they interact with the system. For instance, a customer may first get an "introductory offer" for a service. Then after responding to the offer, perhaps with a predetermined time delay, the customer then gets a "followup" offer. Similarly, the customer can receive a "reminder" offer if they have not responded to the introductory offer. In another example, a series of offers may be sent periodically to customers in a particular segment, or who have expressed some interest in a product. This periodic deliver may continue until the customer request to not received more offers, or the customer finally acts on one of the offers. For these more complex campaign, lifecycle 310 encodes the rules by which these sequences of offers are sent to customers.

Referring to FIG. 4, delivery component 120 is logically composed of separate paths from each user 115 to delivery component 125. Each user 115 specifies campaigns that are queued in a distribution box 410, and then passed as messages to delivery component 125. Note that since each user 115 is free to act independently, campaigns targeted to overlapping classes of users 110 are generally passed to delivery component 125, which then determines which offers, and when, to send to those multiply targeted customers.

Referring to FIG. 5, in an alternative embodiment, users 115 use a design component 120A that provides a hierarchical arrangement of distribution boxes 510. In this arrangement, a user 115 can send a partially specified campaign to the distribution box of another user. For example, one user may be responsible for initiating a marketing campaign, which other users may specify particular content to provided with the offers of that campaign. Another user 115 can inspect the campaigns in his distribution box and choose which to use to make more specific campaigns, or to send to delivery component 125. The distribution of campaigns is optionally controlled by rules that control how campaigns are passed from one distribution box to another. For example, a particular user 115 may identify the types of campaigns he is interested in receiving. Another example is that there may be a limit to the number of offers any particular user may receive during a time interval, such as per week.

The arrangement shown in FIG. 5 can be hosted on a distributed set of computers, and the users may belong to different commercial organizations. For example, a top-level user may belong to the provider of a product or service, such as an automobile manufacturer, while a next-level user 115 may belong to a reseller, such as a regional automobile dealer. The top-level user may send an offer that provides rebates to a limited number of customers, which the next-level user may then decide which particular segment of users to whom to target the rebate promotion.

3 Delivery Component 125 (FIGS. 6-7)

Referring to FIG. 6, delivery component 125 receives campaigns from design components 120. From these campaigns, delivery component 125 forms offers that it passes them to various channels 140. Campaigns received by delivery component 125 are first stored in a campaign store 620, where they are held during the time that they are designed to initiate specific customer offers.

A number of engines take campaigns in campaign store 620 and form offers for specific customers. These formed offers are held in offer store 625. Offers for each customer are held in that customer's "offer box" 628, which is a data structure holding the instantiated offers for that customer. These offers are further divided according to which channel 140 each offer is to be delivered through.

A direct engine 666 takes campaigns that specify offers that are ready to send when they are received by delivery component 135. For instance, direct engine 666 may take information from profiling module 155 or customer profiles 150 to determine the specific set of customers that will receive offers under the campaign. For each of these customers, direct engine 666 forms a separate offer and passes that offer to offer store 625. Each of these offers is associated with a particular channel 140, as specified by the campaign.

A trigger engine 664 handles campaigns that produce offers only when particular criteria become true. For instance, a campaign may send offers to customers after they have initially registered at a web site. Trigger engine 664 receives input from channels 140 and tracking component 130 to determine when the criteria are satisfied.

A lifecycle engine 662 handles complex staged offers. Like trigger engine 664, lifecycle engine 662 relies on information from channels 140 and tracking component 662 to determine when to send offers. In addition, lifecycle engine 662 also uses the history of each customer to determine which offers to send to those customers. In this way, lifecycle engine 662 can produce a staged set of offers as a customer performs a series of actions, such as registration, initial purchase, repeat purchase, etc.

A central module of the deliver component is an offer broker 610. Offer broker 610 acts on offers which are stored in an offer store 625. Offer broker 610 uses a rule-based engine to determine which offers can be sent to customers. An internal set of rules govern overall operation of the broker. When offer broker 610 determines that an offer from the offer store should be sent to a particular customer, it passes that offer to a delivery engine 630 which is responsible composing and transmitting the offer to the selected customer over the channel associated with the offer.

Offer broker 610 performs three primary functions. First, it prioritizes offers for each customer 110. In general, a customer may have multiple offers in his offer box 628, and offer broker 610 determines which offer should be sent next. Second, offer broker 610 implements a limiting function that uses feedback from the customer to prohibit or limit the frequency of various types of offers. The mechanisms by which this feedback is received from customers is described further below. Third, offer broker 610 allocates capacity for the various channels over which offers are presented to customers.

Offer broker 610 selects the delivery engine 630 to which it sends offers based on the channels associated with those offers. For instance, for offers that are specified to be delivered as email, the associated delivery engine 630 composes and passes offers to an email server application. An example of such an offer is one that was triggered by a customer expressing interest in response to a previous offer, or through a broadly targeted Web-based advertisement. Another type of offer uses a "bulk" mailing to a number of customers based on a characteristic specified in the offer. As introduced above, different customers may have email client applications with different capabilities. It is often desirable to make use of formatting and multimedia characteristics of an email message using message formats that may not be universally supported. For example, some email clients support only plain text, some support static HTML-based formatting, some support hyper-links in the HTML, and still others support formatting that includes scripts to execute at the client application, or multimedia content. If the type of email application for a customer is available in customer profile 150, or can be inferred from the address for the email (e.g., and address in the "aol.com" domain is inferred to be associated with client applications supported by the AOL online service) delivery engine 630 composes an appropriate format of email message. Data in the customer profile may be solicited by a survey form or questionnaire in which the user requests the type of email to be sent.

In alternative embodiments in which very large scale bulk email is to be sent, a third-part email service bureau is used and data specifying a large number of instances of an offer is passed to the email service bureau for transmission to the target customers.

Another example of passing offers from offer broker 610 to a customer involve presenting the offers using a customer's web browser application. The delivery engine 630 for the Web channel passes information, directly or indirectly, to web server application. Various approaches to passing this information are used. The Web server application responds to requests from a customer's web browser application. That is, it generally does not typically "push" content to the customer without some input from that customer. In an indirect mode, offer broker 610 passes an offer through delivery engine 630 in anticipation of the next visit by the customer to the web site hosted by the web server application. Delivery engine 630 composes web content associated with that offer. When the targeted customer later visits the web site, the targeted content is available. For instance, an interaction with a customer may involve sending an email message that includes a link to content stored in the web offer database specifically for that customer. Also, the web server application can include the capability to identify the customer, for example by retrieving information from the web browser application (e.g., "cookies") which is uses to identify the content to present. The offer can be presented in a variety of ways, including as "banner ads" that are presented concurrently with other content requested by the web browser, as "pop up" windows, or entire displays dedicated to the offers.

Another method of presenting Web-based offers involves dynamically composing the content. In this mode, the web server application detects the presence of a customer, and it informs trigger engine 664 or lifecycle engine 662. These engines then create a new offer based on the customer's presence that are passed to offer broker 610 through offer store 625. Then, offer broker 610 passes the offer to delivery engine 630 which composes the content for the offer on-the-fly and passes it directly to the web server application.

Offer broker 610 handles allocation of channel capacity among offers to different customers. An example of a limited capacity channel is a call center that has a particular capacity to make outbound telephone calls, for example 100 calls per hour. Offer broker 610 limits the number of offers it sends to that channel based on that limit. Email servers similarly have limits on the number of offers that they can send, or limits on the number of emails that can be sent to a particular classes of customers (such as customers using a particular online service). Channels may have capacity limits that are based on cost. For example, the system may be configure to only allow a particular number of direct mailings based on the cost of those mailings. Indirect channels may also have capacity limits that are managed by offer broker 610. For instance, each agent 144, such as a personal financial planner or an insurance agent, may have a limit on the number of offers that they can handle each day. Indirect channels that make use of automated systems may present limits to offer broker 610 based on their internal configuration. For instance, a lead management system can assemble the limits of its individual users for offer broker 610. Offer broker 610 may also send offers to particular users of a lead management system, and limit the number and type of offers sent to those users based on the configuration of the lead management system, thereby achieving a tight integration of the offer management system and the lead management system.

Offer broker 610 is configurable with rules that are applicable to all or classes of offers. An example of such a rule is that offers that have not been sent in a fixed number of days (e.g., 1 week) are discarded rather than being sent. Other rules relate to limits on the number and types of offers sent to users. For instance, one limiting rule can set the maximum number of emails sent to a customer, or disallow any unsolicited emails to be sent. As is described below, some of these global rules are driven by customer profile data that the customers themselves can set. Other rules relate to prioritization of offers. For example, new product promotions may be given preference over current product promotions. Other prioritization rules may relate to the class of user 115 that originated the offer, for example, preferring offers from a corporate marketing department to those from a local distributor.

Offer broker 610 can also send offers to indirect channels 142, such as through a lead management system. These offers are meant to be delivered to the targeted customers through agents 144. Some offers are send in parallel through both a direct channel 146 and an indirect channel 142. For example, an agent 144 may be made aware of a direct offer to a customer so that they can interact with the customer accordingly, for example, by encouraging them to accept the offer, or by avoiding making conflicting offers.

Offer broker 610 also notifies tracking component 130 of events related to various instances of offers, or classes of offers. In this way, tracking component 130 has data available to it to determine the success of various marketing campaigns, or data related to particular classes of customers.

Delivery component 125 provides a mechanism by which a customer 110 may control the delivery of offers. Referring to FIG. 7, in an example of this mechanism, an offer display 710 presented to a customer through a client email application includes a offer content portion 720, which describes the offer, and an offer control portion 730, which the customer can use to provide feedback to the offer management system. The offer control portion includes one or more controls. For instance, a user can adjust a slider 732 to indicate the frequency of offers he of she wants to receive. Selector buttons 734 indicate preferences, such as whether particular personal information can be used to select further offers, whether that personal information may be shared with other organizations, or the types of offers that the customer is willing to accept. A web-based presentation includes similar offer controls. The feedback provided by the customer is accepted by a web server application 650, and the information provided is used to update that customer's profile. This information then later affect the selection and timing of offers by offer broker 610 for that customer. This mechanism can be thought of as a "privacy filter" in that the customer can select the degree of intrusion that he wants without violating his privacy. In some embodiments, the feedback also specifies other privacy-related characteristics, such as whether to use their browsing patterns is selecting what offers to make, and whether information related to their response to offers may be shared with other organizations.

4 Tracking Component 130

Tracking component 130 provides a mechanism by which users 115, and others, can measure the effectiveness of particular offers or marketing campaigns involving multiple offers. Tracking component 130 records various types of activities by customers. One type of activity is customers accessing particular web content, for instance, content related to previous offers or advertisements. Similarly, particular activity related to offers, such as requests for information, performing commercial transactions, or otherwise explicitly responding to offers are recorded by tracking component 130.

Referring back to FIG. 1, as introduced above, the information collected by tracking component 130 is used by the tracking component to generate reports, to update customer profiles 150, and to populate a marketing database 132. Information received from fulfillment component 135, or other sources of purchase information, are matched to offers thereby allowing the effectiveness of the offers to be measured. Statistical analysis systems, such as SAS, can be used to access data in marketing database 132 to determine statistical measures related to the offers and related marketing campaigns. Reports include those which present return-on-investment (ROI) information. The cost of delivering the offers (including the costs of the promotions) are compared to the returns generated by the offers to generate these reports.

5 Fulfillment Component 135

Fulfillment component 135 supports electronic commerce functions that allow customers 110 to complete commercial transactions that were prompted by offers sent to those customers. Transactions are handled directly by fulfillment component 135, or are passed to another system or organization. Fulfillment component 135 can also make use of a third-party service to complete. the transaction.

6 Alternative Embodiments

In alternative embodiments, not all the channels 140 that are described above are necessarily all included, and various additional channels 140 can be coordinated using offer broker 610. Additional channels can include other electronic delivery approaches, such as offers sent to personal electronic devices, such as PDAs, cellular telephones, and pagers. Some of these may be based on location-based triggering events, such as a customer entering the proximity of a retail store. Another type of channel uses interactive voice response (IVR) telephone approaches to interact with customers.

The limiting mechanisms by which a user provides feedback to the offer broker regarding frequency and type limits on offers are applicable to other channels as well. For instance, an outbound call center channel can provide feedback by the customer telling the calling agent that they do not want to receive particular types of calls or an IVR system can accept touch-tone input from the customer to identify if they are interested in receiving further calls. Similarly, for an indirect channel, an agent 144 can provide feedback identifying the types of offers they want to receive for particular customers. The limiting mechanism is optionally applicable to the agents themselves. For instance, an agent 144 may provide feedback to offer broker 610 that the broker (as opposed to the customers serviced by that agent) desires a frequency or type limit to be imposed on offers sent to him.

In the description above, offer broker 610 is described as making use of rules to select and prioritize offers. In an alternative embodiment, offer broker 610 uses an optimization approach. In one such embodiment, each offer is associated with an expected return as well as a delivery cost. In addition, the expected return of sending multiple offers to individual customers are known to the system such that the return on sending multiple offers is not necessarily simply the sum of the individual returns. Offer broker 610 then performs an optimization to select the offers that provide the most expected return for a given constrain or constrains on cost and capacity.

It is to be understood that the foregoing description is intended to illustrate and not to limit the scope of the invention, which is defined by the scope of the appended claims. Other embodiments are within the scope of the following claims.

What is claimed is:

1. A computer-controlled method for managing and distributing sets of offer data comprising:
preparing sets of offer data characterizing a plurality of offers, each set of offer data associated with a corresponding targeted individual and one of a plurality of channels for presenting corresponding, associated sets of offer data to targeted individuals;
selecting by a computer one or more offers from the sets of offer data to present to the individuals associated with those sets of offer data, the selection based on a rule-based engine executed by the computer the rule-based engine executing offer data processing rules, the offer data processing rules comprising a set of time based rules including a direct rule that immediately instantiates offers based on an offer campaign, a triggered rule that instantiates offers based on the occurrence of particular conditions, and a staged rule that instantiates offers based on user interaction with previous offers;
selecting one of these time based rules to determine which offers from the sets of offer data can be sent to the individuals;
executing the selected time based rules to determine the selected offers; and
presenting the selected offers to the associated individuals over the associated ones of the plurality of channels.

2. The method of claim 1 wherein selecting from the sets of offer data includes
prioritizing offers for individuals, and selecting offers according to their priorities.

3. The method of claim 1 wherein selecting from the sets of offer data includes:
allocating capacity of the plurality of channels to the selected offers according to a capacity associated with each of the channels.

4. The method of claim 1 wherein presenting the selected offers includes:
accepting information from individuals and limiting presentation of the offers to individuals according to accepted information.

5. The method of claim 4 wherein the accepted information characterizes acceptable timing of presentation of offers to the individuals, and limiting presentation of offers includes scheduling presentation of offers to the individuals according to the acceptable timing.

6. The method of claim 1 wherein preparing the sets of offer data characterizing the offers includes preparing data characterizing conditions under which said offers are to be presented.

7. The method of claim 1 wherein preparing the sets of offer data
characterizing the offers includes preparing data characterizing the target groups associated with said offers.

8. The method of claim 1 wherein preparing the sets of offer data characterizing the offers includes preparing data characterizing information to be presented with the offers.

9. The method of claim 1 further comprising:
tracking activities of the individuals to whom the offers were presented; and
generating statistics related an effectiveness of the offers.

10. The method of claim 1 further comprising:
tracking activities of the individuals to whom the offers were presented; and
presenting a sequence of related offers to those individuals based on their tracked activities.

11. The method of claim 1 wherein preparing the sets of offer data characterizing the offers includes, for at least some of the offers, a first user preparing data characterizing a class of offers, passing the data characterizing the class of offers to a second user, and the second user preparing additional data characterizing the offer.

12. The method of claim 1 further comprising storing the prepared sets of offer data in a shared storage, and wherein selecting from the sets of offer data is performed in a distributed manner in which separate computers access the shared storage.

13. A computer-controlled method for managing and distributing sets of offer data comprising:
preparing sets of offer data characterizing a plurality of offers, each set of offer data associated with a corresponding targeted individual and one of a plurality of channels for presenting sets of offer data to targeted individuals;

selecting by one or more computers, one or more offers from the sets of offer data to present to the individuals associated with those sets of offer data, including:
  prioritizing sets of offer data for particular individuals, and selecting offers according to the priorities,
  allocating capacity of the plurality of channels to the selected offers according to a capacity associated with each of the channels,
  accepting information from individuals and limiting presentation of the offers according to said accepted information,
  executing by a computer system a rule-based engine that executes offer data processing rules, the rules comprising a set of time based rules including a direct rule that immediately instantiates offers based on an offer campaign, a triggered rule that instantiates offers based on the occurrence of particular conditions, and a staged rule that instantiates offers based on user interaction with previous offers;
  selecting one of these time based rules to determine which offers can be sent to each of the individuals; and
  presenting the selected offers to the associated individuals over the associated ones of the plurality of channels.

14. The method of claim 13 further comprises:
  tracking activities of the individuals to whom the offers were presented; and
  presenting a sequence of related offers to those individuals based on their tracked activities.

15. A computerized offer management system, the computerized system comprising:
  an offer design component for preparing sets of offer data characterizing a plurality of offers, each set of offer data associated with a corresponding target group of individuals; and
  a delivery component for selecting and presenting one or more offers from the sets of offer data, to the individuals in the corresponding target groups, with the selection based on a rule-based engine that executes offer data processing rules, the rules comprising execution of at least one time based rule that is selected from a set of time based rules that includes a direct rule that immediately instantiates offers based on an offer campaign, a triggered rule that instantiates offers based on the occurrence of particular conditions, and a staged rule that instantiates offers based on user interaction with previous offers, the delivery component limiting presentation of offers to individuals in the corresponding targets groups.

16. The system of claim 15 further comprises:
  a capacity allocation component that allocates the plurality of channels to the selected offers, according to a capacity associated with each of the channels.

17. An offer management system comprising:
  a processor;
  memory;
  a computer storage medium comprising a computer program product comprising instructions for causing the processor to:
    prepare sets of offer data characterizing a plurality of offers, each set of offer data associated with a corresponding targeted individual and one of a plurality of channels for presenting sets of offer data to targeted individuals;
    determine a selection of one or more offers from the sets of offer data for presenting to the individuals associated with those sets of offer data,
    execute by the processor offer data processing rules, at least one of the rules comprising a time based rule, with the time based rule selected from a set of time based rules including a direct rule that immediately instantiates offers based on an offer campaign, a triggered rule that instantiates offers based on the occurrence of particular conditions, and a staged rule that instantiates offers based on user interaction with previous offers;
    selecting of one of the time based rules to determine which offers can be sent to each of those individuals; and
    cause the selected offers to be presented to the associated individuals over the associated ones of the plurality of channels.

18. The system of claim 17 wherein the computer program product further comprises instructions to cause the processor to:
  allocate capacity of the plurality of channels to the selected offers according to a capacity associated with each of the channels.

19. A computer program product tangibly stored on computer-readable storage media comprising instructions for causing a computer system to:
  prepare sets of offer data characterizing a plurality of offers, each set of offer data associated with a corresponding targeted individual and one of a plurality of channels for presenting sets of offer data to targeted individuals;
  receive by one or more computer systems a selection of one or more offers from the sets of offer data to present to the individuals associated with those sets of offer data, the selection based on a rule-based engine executed by the computer system that executes offer data processing rules, the rules comprising a set of time based rules including a direct rule that immediately instantiates offers based on an offer campaign, a triggered rule that instantiates offers based on the occurrence of particular conditions, and a staged rule that instantiates offers based on user interaction with previous offers;
  receive by one or more computer systems a selection of one of these time based rules to determine which sets of offer data can be sent to each of those individuals; and
  cause the selected offers to be presented to the associated individuals over the associated ones of the plurality of channels.

20. The computer program product of claim 16 wherein the computer program product further comprises instructions to cause the processor to:
  allocate capacity of the plurality of channels to the selected offers according to a capacity associated with each of the channels.

* * * * *